United States Patent
Sakhnini et al.

(10) Patent No.: US 11,751,231 B2
(45) Date of Patent: Sep. 5, 2023

(54) SWITCHING CONFIGURATION FOR PERIODIC RESOURCES

(71) Applicant: QUALCOMM Incorporated, San Diego, CA (US)

(72) Inventors: Iyab Issam Sakhnini, San Diego, CA (US); Tao Luo, San Diego, CA (US); Olufunmilola Omolade Awoniyi-Oteri, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/458,096

(22) Filed: Aug. 26, 2021

(65) Prior Publication Data
US 2022/0095320 A1 Mar. 24, 2022

Related U.S. Application Data

(60) Provisional application No. 63/082,381, filed on Sep. 23, 2020.

(51) Int. Cl.
*H04W 72/12* (2023.01)
*H04W 72/54* (2023.01)
*H04W 72/1268* (2023.01)
*H04W 52/36* (2009.01)
*H04W 72/044* (2023.01)
*H04W 72/21* (2023.01)
*H04W 72/23* (2023.01)

(52) U.S. Cl.
CPC ........ *H04W 72/54* (2023.01); *H04W 52/365* (2013.01); *H04W 72/044* (2013.01); *H04W 72/1268* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,849,005 | B2 * | 11/2020 | Lee | H04W 72/046 |
| 2020/0022126 | A1 * | 1/2020 | You | H04W 80/02 |
| 2020/0314681 | A1 * | 10/2020 | Kuo | H04W 28/0268 |
| 2021/0050900 | A1 * | 2/2021 | Deghel | H04W 72/046 |
| 2021/0167930 | A1 * | 6/2021 | Jeon | H04B 17/318 |
| 2021/0204313 | A1 * | 7/2021 | Takeda | H04W 72/14 |
| 2021/0243624 | A1 * | 8/2021 | Moosavi | H04W 24/08 |
| 2021/0315049 | A1 * | 10/2021 | Wei | H04W 76/36 |
| 2022/0210823 | A1 * | 6/2022 | Alfarhan | H04L 1/1819 |

* cited by examiner

*Primary Examiner* — Kodzovi Acolatse
(74) *Attorney, Agent, or Firm* — Procopio, Cory, Hargreaves & Savitch LLP

(57) ABSTRACT

A UE may receive, from a base station, a first and second configurations of first and second periodic resources, receive, from the base station, a metric for switching between the first and second configurations, and switching from the first configuration to the second configuration based on the metric received from the base station. The first and second configurations may be CG of uplink resources for uplink channels. The first and second configurations may indicate SPS resources for downlink channels. The base station may determine the metric based on at least one measurement of signal at the base station or scheduling requirements.

28 Claims, 10 Drawing Sheets

SWITCHING CONFIGURATION FOR PERIODIC RESOURCES

CROSS REFERENCE TO RELATED APPLICATION(S)

This application claims the benefit of and priority to U.S. Provisional Application Ser. No. 63/082,381, entitled "METHODS AND APPARATUS FOR SWITCHING CONFIGURATION FOR PERIODIC RESOURCES" and filed on Sep. 23, 2020, which is expressly incorporated by reference herein in its entirety.

TECHNICAL FIELD

The present disclosure relates generally to communication systems, and more particularly, to a method for wireless communication including configuration switching for periodic resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A UE may receive, from a base station, a first and second configurations of first and second periodic resources, receive, from the base station, a metric for switching between the first and second configurations, and switching from the first configuration to the second configuration based on the metric received from the base station. The first and second configurations may be CG of uplink resources for uplink channels. The first and second configurations may indicate SPS resources for downlink channels. The base station may determine the metric based on at least one measurement of signal at the base station or scheduling requirements. The metric may include at least one of a timer, an inactivity timer, a buffer status report (BSR) threshold value, a power headroom report (PHR) threshold value, a beam change, and/or a subband (SB) or a bandwidth part (BWP). The metric may be configured for each beam, or for application to all beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
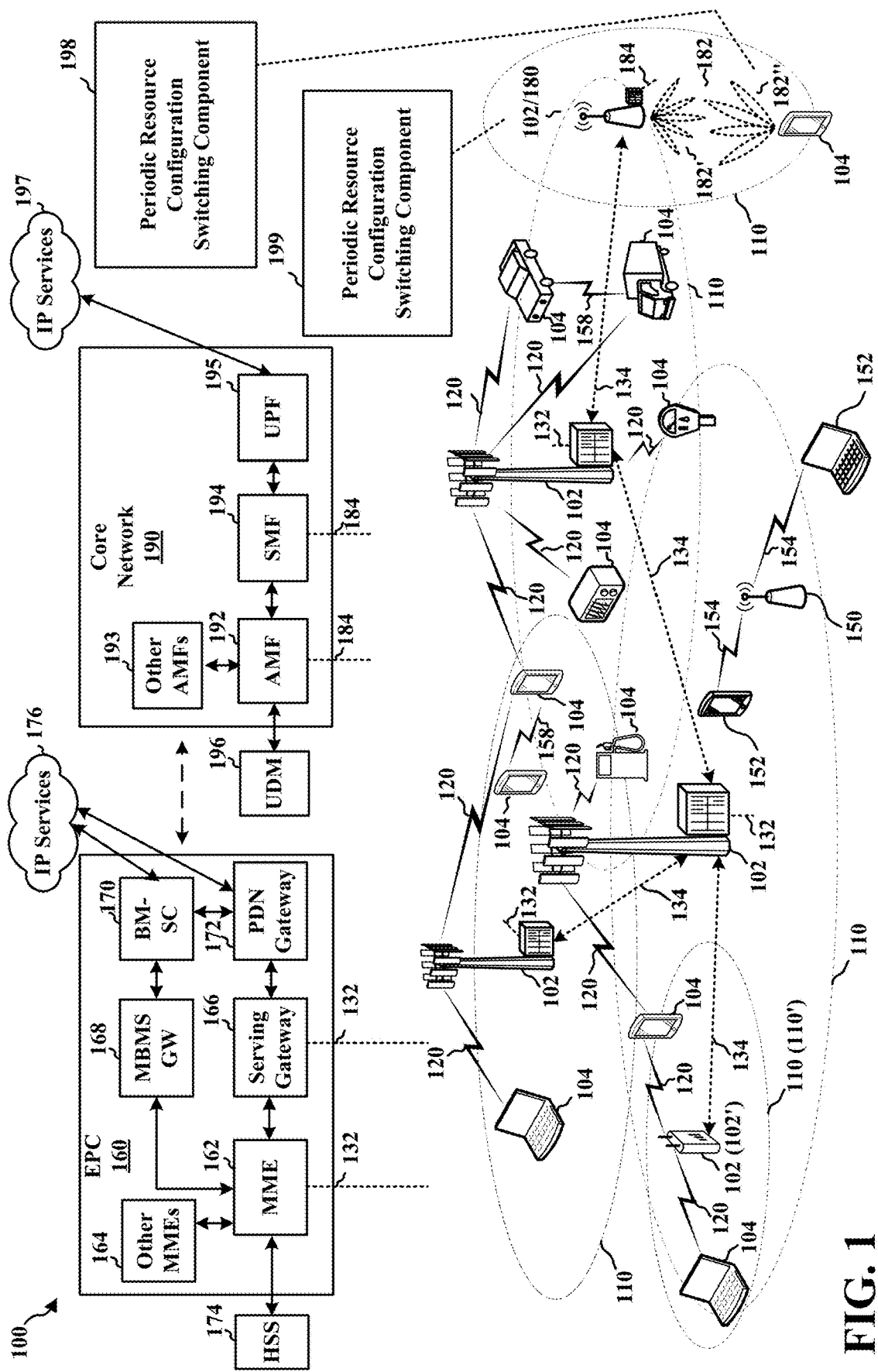
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a periodic resource configuration switching component 198 configured to receive a metric for switching between first and second configurations for periodic resources, and switch between the first and second configurations for the periodic resources. In certain aspects, the base station 180 may include a periodic resource configuration switching component 199 configured to transmit a metric for switching between the first and second configurations for periodic resources, and switch between the first and second configurations for the periodic resources. Although the following description may be focused on 5G NR, the concepts described herein may be applicable to other similar areas, such as LTE, LTE-A, CDMA, GSM, and other wireless technologies.

Figure 2:
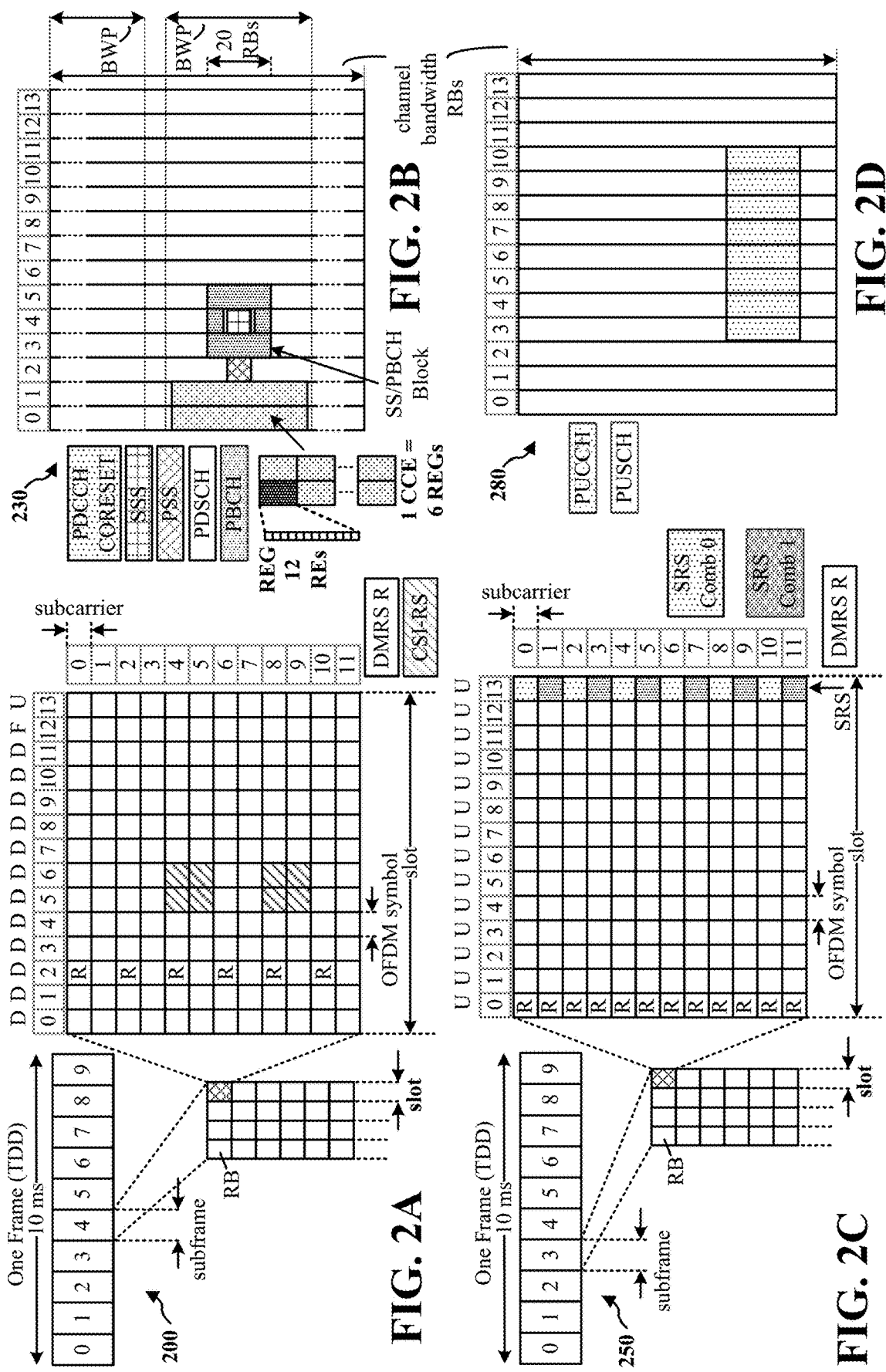
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |

-continued

| μ | SCS Δf = $2^\mu \cdot 15$[kHz] | Cyclic prefix |
|---|---|---|
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
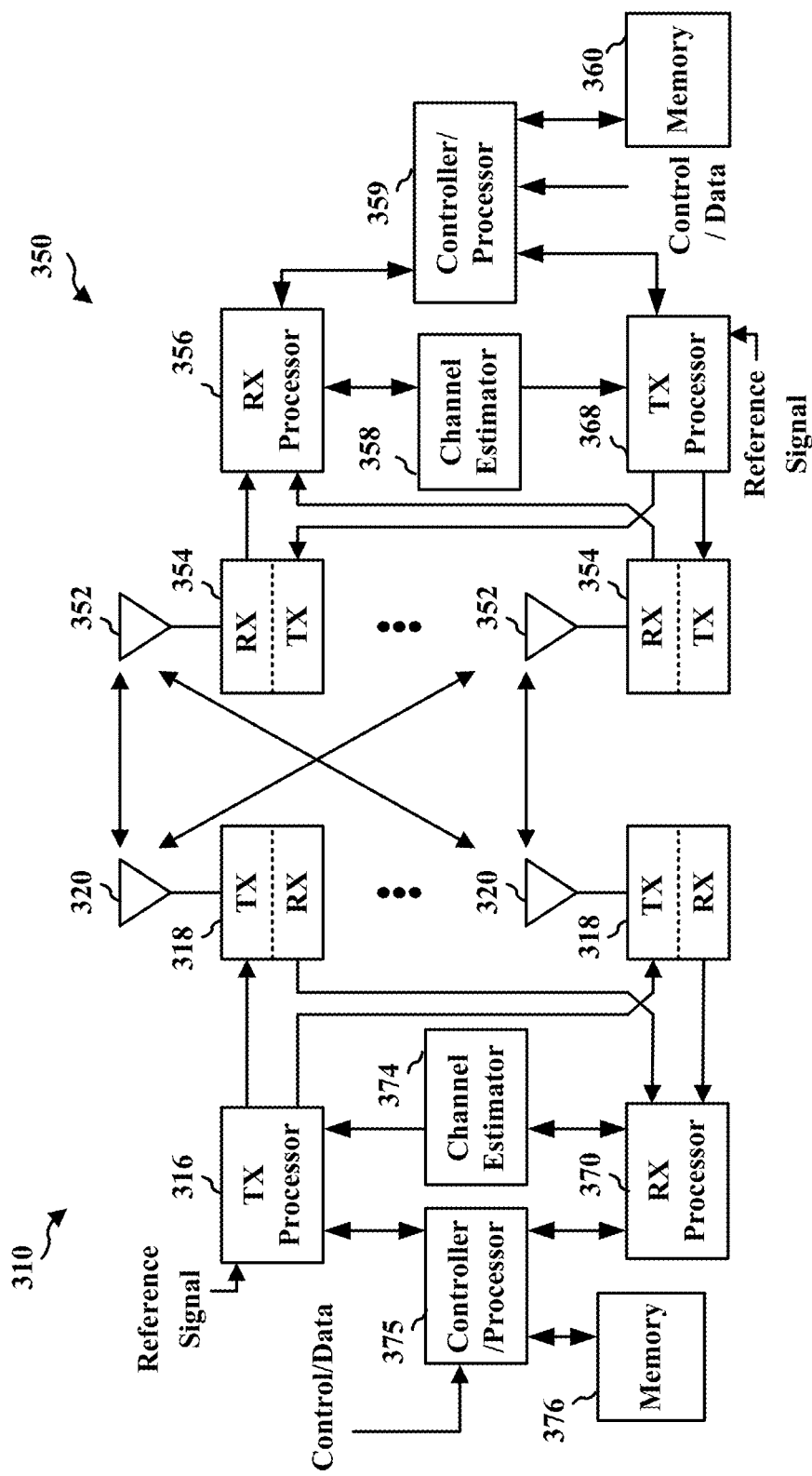
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Wireless communication may support higher capability devices as well as reduced capability devices. Examples of the higher capability devices may include premium smartphones, V2X devices, URLLC devices, eMBB devices, etc. The reduced capability devices may include wearables, industrial wireless sensor networks (IWSN), surveillance cameras, low-end smartphones, etc. For example, NR communication systems may support both the higher capability devices and the reduced capability devices. A reduced capability device may be referred to as an NR light device, a low-tier device, a lower tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In one example, a reduced capability UE may have an uplink transmission power of at least 10 dB less than that a higher capability UE. In another example, a reduced capability UE may have reduced transmission bandwidth or reception bandwidth than other UEs. For instance, a reduced capability UE may have an operating bandwidth between 5 MHz and 20 MHz for both transmission and reception, in contrast to other UEs which may have a bandwidth of up to 100 MHz. In another example, a reduced capability UE may have a reduced number of reception antennas in comparison to other UEs. For instance, a reduced capability UE may have only a single receive antenna and may experience a lower equivalent receive signal to noise ratio (SNR) in comparison to higher capability UEs that may have multiple antennas. The reduced capability UEs may also have a reduced computational complexity in comparison to other UEs.

It may be helpful for communication to be scalable and deployable in a more efficient and cost-effective way. In some aspects, it may be possible to relax or reduce peak throughput, latency, and/or reliability requirements for the reduced capability devices. In some examples, reductions in power consumption, complexity, production cost, and/or reductions in system overhead may be prioritized. For example, industrial wireless sensors may have an acceptable up to approximately 100 ms. In comparison, some safety related applications, e.g., industrial wireless sensors, may have the latency of up to 10 ms or 5 ms. In some aspects, the UE may have asymmetrically specified uplink and downlink transmissions. In one aspect, the data rate may be lower or may include more uplink traffic than downlink traffic. For example, video surveillance devices may have an acceptable latency up to approximately 500 ms.

In some aspects, the reduced capability devices may have UL heavy use cases (e.g., video surveillance cameras and industrial wireless sensors) that may be configured to send bursts of uplink data (e.g., video recordings) for a certain amount of time period. The reduced capability devices may be configured to reduce or optimize the power and/or the bandwidth. Semi-persistent scheduling (SPS) and/or a configured grant (CG) may provide a configuration of periodic resources for data transmission with the UE (e.g., over downlink or uplink). The UE may use the periodic resources to transmit or receive data without additional dynamic scheduling. Based on the change of the uplink/downlink data pattern, the UE may apply different configurations of CG and/or SPS for uplink and/or downlink, respectively. For example, the different configurations may have more or less frequent CG resources (such as CG occasions), different number of RBs allocated in the CG occasions, different modulation and coding scheme (MCS), etc. For example, the reduced capability devices may be a video camera configured to use CG to upload data using a configuration with a large bandwidth and more frequent CG occasions. However, when the data transmission ends, the reduced capability devices may not need many RBs or frequent CG occasions. The reduced capability devices may reduce the use of CG resources allocated in time (periodicity) and/or bandwidth (RB allocation) by switching to a different CG configuration. The reduced capability devices may switch between different CG configurations that correspond to the data transmission pattern may help to maintain the allocated resources when additional data arrives, while reducing the overall allocated resources.

In some aspects, the base station may transmit a DCI to a reduced capability device to indicate for the device to switch between the SPS/CG configurations. Here, transmitting the additional signals from the base station to indicate each switch between the SPS/CG configurations may increase signaling overhead and add delays. Aspects provided herein enable a more efficient use of wireless resources through an implicit way to switch between different SPS/CG configurations without added overhead for signaling the switch.

In some aspects, a UE may be able to implicitly switch the active SPS configurations and/or CG configurations based on pre-configured rules signaled to the UE by a base station. That is, the base station may instruct different configurations for periodic resources and at least one rule or metric to the UE, and the UE may implicitly switch between the different configurations for the periodic resources. For example, the base station may provide the UE with multiple SPS or CG configurations (e.g., including a first configuration (e.g., a first SPS/CG configuration), a second configuration (e.g., a second SPS/CG configuration)). The base station may also provide the UE with at least one of metric that triggers the UE to switch between the multiple SPS/CG configurations. The UE may apply the first configuration to transmit/receive data based on the periodic resources of the first SPS/CG configuration. If a first metric is met, the UE may switch from the first configuration to the second configuration based on the at least one metric being met, e.g., the metric having been previously received from the base station. For example, if the UE determines the occurrence of an event based on the metric, the UE may switch between the configurations.

In one aspect, the at least one metric may be related to a specific timer. That is, the SPS/CG configuration may be active for a certain time, e.g., until the timer expires, then may switch automatically to a different configuration. For example, when the UE configures the periodic resources based on the first configuration, the UE may start a timer based on the at least one metric received from the base station. The UE may switch from the first configuration to the second configuration in response to the expiration of the timer.

A configuration switching rule, or the metric(s), may be based on traffic activity. That is, an inactivity timer may be started when there is no data being sent in a transmission/reception occasion of a current SPS/CG configuration. The timer may continue to run while there is no data being sent in the periodic resources of the current SPS/CG configuration. If the timer expires, the UE may switch automatically to a different configuration. For example, the expiration of the timer may be determined by the UE to be an occurrence of an event that triggers a switch between the SPS/CG configurations. The UE may run the inactivity timer in response to no data being transmitted or received based through the configured periodic resources and switch to the second configuration in response to the expiration of the inactive timer.

A configuration switching rule, or the metric(s), may be based on a buffer status report (BSR). That is, the UE may switch automatically to a different configuration if BSR meets a configured value, e.g., a BSR threshold. For example, the metric received from the base station may indicate the BSR threshold to the UE, and the UE may switch between different configurations in response to the BSR meeting the BSR threshold indicated from the base station. The UE may use the periodic resources based on the first configuration and switch to a second configuration in response to the BSR dropping to lower than the BSR threshold value. Also, the UE may use the periodic resources based on the second configuration and switch to the first configuration in response to the BSR rising to equal to or greater than the BSR threshold value.

The configuration switching rule, or the metric(s), may be based on a power headroom report (PHR). That is, the UE may switch automatically to a different configuration if PHR meets a configured value or a PHR threshold. For example, the metric received from the base station may indicate the PHR threshold to the UE, and the UE may switch between different configurations in response to the PHR crossing the PHR threshold indicated from the base station. The UE may use the periodic resources based on the first configuration and switch to a second configuration in response to the PHR dropping to lower than the PHR threshold value. Also, the UE may use the periodic resources based on the second configuration and switch to the first configuration in response to the PHR rising to equal to or greater than the PHR threshold value.

The configuration switching rule, or the metric(s), may be based on a beam used for communication between the UE and the base station. That is, the UE may switch automatically to a different configuration if the beam changes (e.g., based on a transmission configuration indicator (TCI) state or a spatial relation change). For example, the metric received from the base station may indicate the beams associated with the different configurations, and the UE may switch between different configurations in response to the beam changes. The UE may use the periodic resources based on the first configuration when using a first beam, and switch to a second configuration in response to changing the beam to a second beam.

The configuration switching rule, or the metric(s), may be based on subband (SB) and/or BWP. That is, the UE may switch automatically to a different configuration if the SB and/or BWP changes. For example, the metric received from the base station may indicate the SB and/or BWP associated with the different configurations, and the UE may switch between different configurations in response to the SB and/or BWP changes. The UE may use the periodic resources based on the first configuration when using a first SB and/or a first BWP, and switch to a second configuration in response to changing the beam to the second SB and/or the second BWP.

In some aspects, the at least one configuration switching rule (or metric) may be determined by the base station. In one aspect, the at least one configuration switching rule (or metric) may be determined based on network, e.g., based on the base station measurements or scheduling needs. That is, the base station may determine the metric based on at least one measurement of signal at the base station or scheduling requirements. In another aspect, the UE may provide a recommendation for the metric to the base station. For example, the UE may transmit at least one of the recommended metrics to the base station based on traffic patterns at the UE. The base station may take the recommended metrics received from the UE into consideration when determining the metric to be indicated to the UE.

In one aspect, the configuration switching rule, or metrics may be determined and indicated for application per-beam or for application to all beams. That is, the base station may determine and indicate at least one metric for each beam to be used for transmission of the configured periodic resources. The base station may also determine and indicate at least one metric to be applied to all beams to be used for transmissions of the configured periodic resources.

Figure 4:
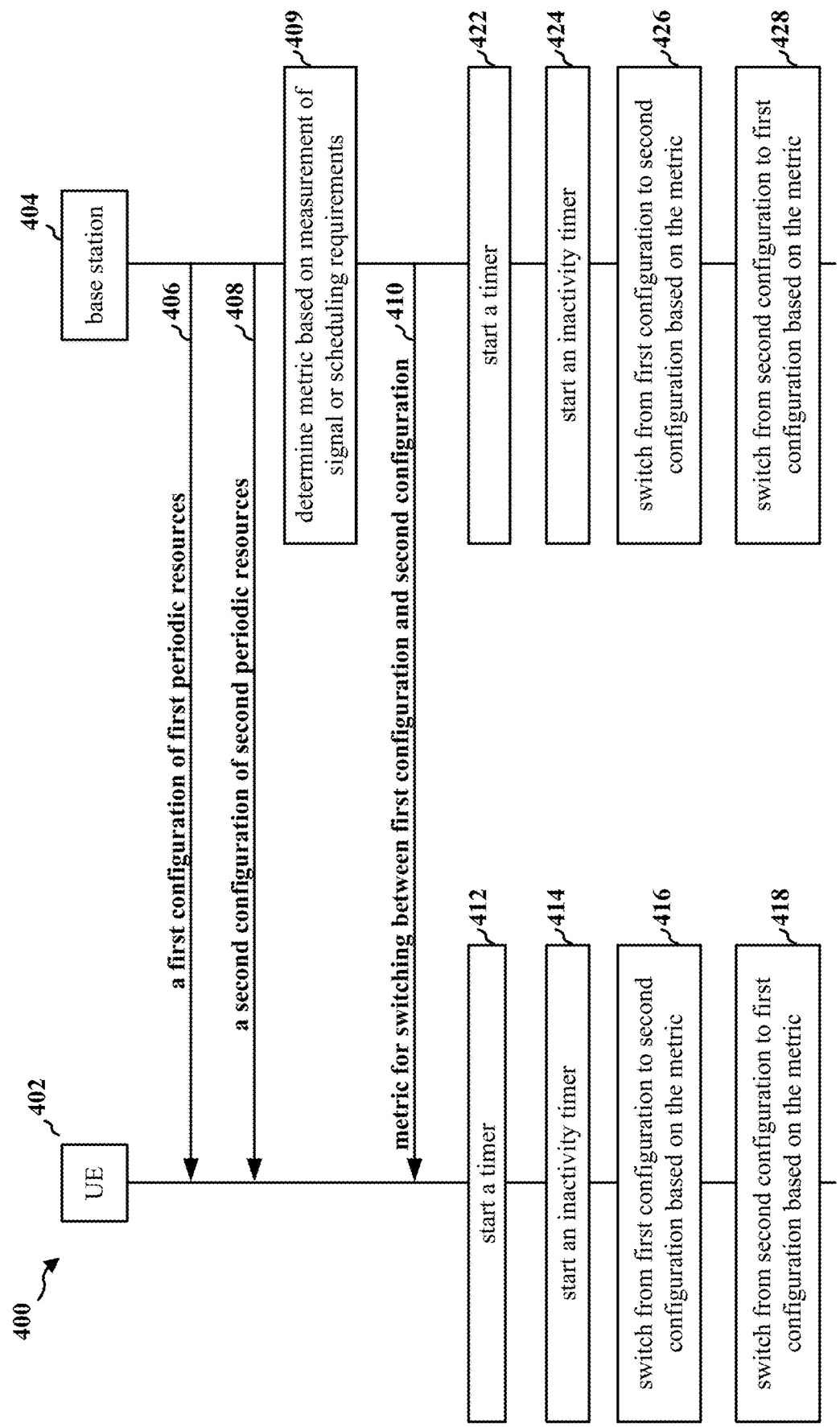
FIG. 4 is a call-flow diagram of wireless communication.

FIG. 4 is a call-flow diagram 400 of wireless communication, including a UE 402 and a base station 404. The base station 404 may configure a first configuration of first periodic resources and a second configuration of second periodic resources for the UE 402, and switch between the first configuration and the second configuration to communicate with the UE 402 based on a metric. Although the example is provided for two configurations of periodic resources, the concept may be similarly applied to more than two configurations of periodic resources. The UE 402 may receive, from the base station 404, the first configuration of the first periodic resources and the second configuration of the second periodic resources, and may switch between the first configuration and the second configuration to communicate with the base station 404 based on the metric received from the base station 404.

At 406, the base station 404 may transmit a first configuration of first periodic resources to the UE 402. The UE 402 may receive, from the base station 404, the first configuration of the first periodic resources. The first configuration may be a first CG or a first SPS of first periodic uplink resources. In one aspect, the first configuration may be the first CG of the first periodic resources for uplink transmissions. In another aspect, the first configuration may be the first SPS of the first periodic resources for uplink transmissions.

At 408, the base station 404 may transmit a second configuration of second periodic resources to the UE 402. The UE 402 may receive, from the base station 404, the second configuration of the second periodic resources. The second configuration may be a second CG or a second SPS of second periodic uplink resources. In one aspect, the second configuration may be the second CG of the second periodic resources for uplink transmissions. In another aspect, the second configuration may be the second SPS of the second periodic resources for uplink transmissions. The second configuration may be different from the first configuration.

At 409, the base station 404 may determine a metric based on at least one measurement of signal at the base station 404 or scheduling specifications. The UE 402 and the base station 404 may select one of the first configuration or the second configuration based on the metric. The UE 402 may provide a recommendation for the metric to the base station 404, and the base station 404 may take the recommended metrics received from the UE 402 into consideration to determine the metric to be indicated to the UE 402.

In some aspects, the UE 402 and the base station 404 may switch between the first configuration and the second configuration based on the metric being met. In one aspect, the metric may be a timer, which may be started in response to using one of the first configuration or the second configuration, and the UE 402 and the base station 404 may switch to the other one of the first configuration or the second configuration based on expiration of the timer. In another aspect, the metric may be an inactivity timer, which may be started in response to no data being communicated (transmitted or received) based on one of the first configuration or the second configuration, and the UE 402 and the base station 404 may switch to the other one of the first configuration or the second configuration based on expiration of the inactivity timer. In another aspect, the metric may be a BSR threshold value, and the UE 402 and the base station 404 may switch between the first configuration and the second configuration in response to a BSR under current configuration being lower than the BSR threshold value. In another aspect, the metric may be a PHR threshold value, and the UE 402 and the base station 404 may switch between the first configuration and the second configuration in response to a PHR under current configuration being lower than the PHR threshold value. In another aspect, the metric may be a beam change, and the UE 402 and the base station 404 may switch between the first configuration and the second configuration in response to an occurrence of the beam change. In another aspect, the metric may be a change of an SB or a BWP, and the UE 402 and the base station 404 may switch between the first configuration and the second configuration in response to an occurrence of the SB or the BWP change.

At 410, the base station 404 may transmit the metric for switching between the first configuration and the second configuration to the UE 402. The UE 402 may receive, from the base station 404, the metric for switching between the first configuration and the second configuration. The UE 402 and the base station 404 may switch between the first configuration and the second configuration based on the metric for switching between the first configuration and the second configuration.

At 412, the UE 402 may start a timer. That is, the metric may be a timer, and the timer may be started in response to using one of the first configuration or the second configuration. The UE 402 may switch to the other one of the first configuration or the second configuration based on expiration of the timer. In one aspect, the UE 402 may start the timer in response to using the first configuration, and switch to the second configuration in response to the expiration of the timer. In another aspect, the UE 402 may start the timer in response to using the second configuration, and switch to the first configuration in response to the expiration of the timer.

At 414, the UE 402 may start an inactivity timer. That is, the metric may be an inactivity timer, which may be started in response to no data being communicated (transmitted or received) based on one of the first configuration or the second configuration, and the UE 402 may switch to the other one of the first configuration or the second configuration based on expiration of the inactivity timer. In one aspect, the UE 402 may start the inactivity timer in response to no data being transmitted or received based on the first configuration, and switch to the second configuration in response to the expiration of the inactivity timer. In another aspect, the UE 402 may start the inactivity timer in response to no data being transmitted or received based on the second configuration, and switch to the first configuration in response to the expiration of the inactivity timer.

At 416, the UE 402 may switch from the first configuration to the second configuration based on the metric received from the base station 404, and at 418, the UE 402 may also switch from the second configuration to the first configuration based on the metric received from the base station 404. When the first and second configurations are the first and second CGs of first and second uplink resources, the UE 402 may switch from transmitting an uplink channel using the first CG to transmitting the uplink channel using the second CG if the metric is met. When the first and second configurations indicate the first and second SPS resources, the UE 402 may switch from receiving a downlink channel using the first SPS resources to receiving the downlink channel using the second SPS resources if the metric is met.

In one aspect, the metric may include the timer, which may be started in response to using one of the first configuration or the second configuration, and the UE 402 may switch to the other one of the first configuration or the second configuration based on expiration of the timer. In another aspect, the metric may be an inactivity timer, which may be started in response to no data being communicated (transmitted or received) based on one of the first configuration or the second configuration, and the UE 402 may switch to the other one of the first configuration or the second configuration based on expiration of the inactivity timer. In another aspect, the metric may include the BSR threshold value, and the UE 402 may switch between the first configuration and the second configuration in response to a BSR under current configuration being lower than the BSR threshold value. In another aspect, the metric may include the PHR threshold value, and the UE 402 may switch between the first configuration and the second configuration in response to a PHR under current configuration being lower than the PHR threshold value. In another aspect, the metric may include the beam change, and the UE 402 may switch between the first configuration and the second configuration in response to an occurrence of the beam change. In another aspect, the metric may include the change of an SB or a BWP, and the UE 402 may switch between the first configuration and the second configuration in response to an occurrence of the SB or the BWP change.

At 422, the base station 404 may start a timer. That is, the metric may be a timer, and the timer may be started in response to using one of the first configuration or the second configuration. The base station 404 may switch to the other one of the first configuration or the second configuration based on expiration of the timer. In one aspect, the base station 404 may start the timer in response to using the first configuration, and switch to the second configuration in response to the expiration of the timer. In another aspect, the base station 404 may start the timer in response to using the second configuration, and switch to the first configuration in response to the expiration of the timer At 424, the base station 404 may start an inactivity timer. That is, the metric may be an inactivity timer, which may be started in response to no data being communicated (transmitted or received) based on one of the first configuration or the second configuration, and the base station 404 may switch to the other one of the first configuration or the second configuration based on expiration of the inactivity timer. In one aspect, the base station 404 may start the inactivity timer in response to no data being transmitted or received based on the first configuration, and switch to the second configuration in response to the expiration of the inactivity timer.

At 426, the base station 404 may switch from the first configuration to the second configuration based on the metric transmitted to the UE 402, and at 428, the base station 404 may also switch from the second configuration to the first configuration based on the metric transmitted to the UE 402. When the first and second configurations are the first and second CGs of first and second uplink resources, the base station 404 may switch from transmitting an uplink channel using the first CG to transmitting the uplink channel using the second CG if the metric is met. When the first and second configurations indicate the first and second SPS resources, the base station 404 may switch from receiving a downlink channel using the first SPS resources to receiving the downlink channel using the second SPS resources if the metric is met.

In one aspect, the metric may include the timer, which may be started in response to using one of the first configuration or the second configuration, and the base station 404 may switch to the other one of the first configuration or the second configuration based on expiration of the timer. In another aspect, the metric may be an inactivity timer, which may be started in response to no data being communicated (transmitted or received) based on one of the first configuration or the second configuration, and the base station 404 may switch to the other one of the first configuration or the second configuration based on expiration of the inactivity timer. In another aspect, the metric may include the BSR threshold value, and the base station 404 may switch between the first configuration and the second configuration in response to a BSR under current configuration being lower than the BSR threshold value. In another aspect, the metric may include the PHR threshold value, and the base station 404 may switch between the first configuration and the second configuration in response to a PHR under current configuration being lower than the PHR threshold value. In another aspect, the metric may include the beam change, and the base station 404 may switch between the first configuration and the second configuration in response to an occurrence of the beam change. In another aspect, the metric may include the change of an SB or a BWP, and the base station 404 may switch between the first configuration and the second configuration in response to an occurrence of the SB or the BWP change.

Figure 5:
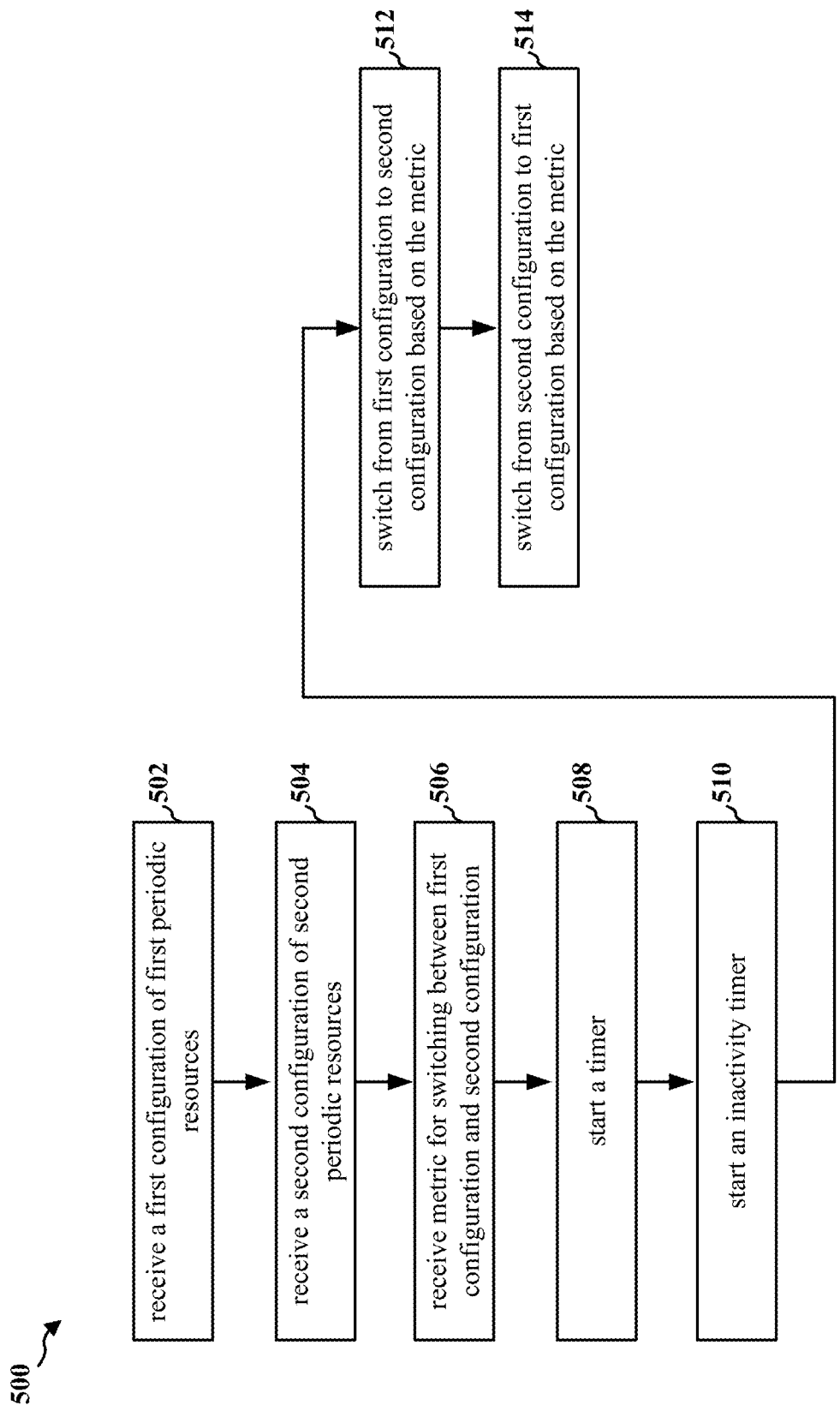
FIG. 5 is a flowchart of a method of wireless communication.

FIG. 5 is a flowchart 500 of a method of wireless communication. The method may be performed by a UE (e.g., the UE 104/402; the apparatus 902). The UE may receive, from the base station, a first configuration of first periodic resources and a second configuration of second periodic resources, and switch between the first configuration and the second configuration based on a metric received from the base station.

At 502, the UE may receive, from the base station, a first configuration of first periodic resources from the base station (e.g., at 406). The UE may receive, from the base station, the first configuration of the first periodic resources. The first configuration may be a first CG or a first SPS of first periodic uplink resources. In one aspect, the first configuration may be the first CG of the first periodic resources for uplink transmissions. In another aspect, the first configuration may be the first SPS of the first periodic resources for uplink transmissions. For example, at 406, the UE 402 may receive, from the base station 404, the first configuration of the first periodic resources. Furthermore, 502 may be performed by a periodic resource configuration managing component 940.

At 504, the UE may receive, from the base station, a second configuration of second periodic resources from the base station (e.g., at 408). The second configuration may be a second CG or a second SPS of second periodic uplink resources. In one aspect, the second configuration may be the second CG of the second periodic resources for uplink transmissions. In another aspect, the second configuration may be the second SPS of the second periodic resources for uplink transmissions. For example, at 408, the UE 402 may receive, from the base station 404, the second configuration of the second periodic resources. Furthermore, 504 may be performed by a periodic resource configuration managing component 940.

At 506, the UE may receive a metric for switching between the first configuration and the second configuration from the base station (e.g., at 410). The UE and the base station may switch between the first configuration and the second configuration based on the metric for switching between the first configuration and the second configuration. For example, at 410, the UE 402 may receive, from the base station 404, the metric for switching between the first configuration and the second configuration. Furthermore, 506 may be performed by a metric managing component 942.

At 508, the UE may start a timer based on the metric received at 506 (e.g., at 412). That is, the metric may be a timer, and the timer may be started in response to using one of the first configuration or the second configuration. The UE may switch to the other one of the first configuration or the second configuration based on expiration of the timer. In one aspect, the UE may start the timer in response to using the first configuration, and switch to the second configuration in response to the expiration of the timer. In another aspect, the UE may start the timer in response to using the second configuration, and switch to the first configuration in response to the expiration of the timer. For example, at 412, the UE 402 may start a timer. Furthermore, 508 may be performed by a timer component 944.

At 510, the UE may start an inactivity timer based on the metric received at 506 (e.g., at 414). That is, the metric may be an inactivity timer, which may be started in response to no data being communicated (transmitted or received) based on one of the first configuration or the second configuration, and the UE may switch to the other one of the first configuration or the second configuration based on expiration of the inactivity timer. In one aspect, the UE may start the inactivity timer in response to no data being transmitted or received based on the first configuration, and switch to the second configuration in response to the expiration of the inactivity timer. In another aspect, the UE may start the inactivity timer in response to no data being transmitted or received based on the second configuration, and switch to the first configuration in response to the expiration of the inactivity timer. For example, at 414, the UE 402 may start an inactivity timer. Furthermore, 510 may be performed by the timer component 944.

At 512, the UE may switch from the first configuration to the second configuration based on the metric received from the base station (e.g., at 416). At 514, the UE may switch from the second configuration to the first configuration based on the metric received from the base station (e.g., at 418). When the first and second configurations are the first and second CGs of first and second uplink resources, the UE may switch from transmitting an uplink channel using the first CG to transmitting the uplink channel using the second CG if the metric is met. When the first and second configurations indicate the first and second SPS resources, the UE may switch from receiving a downlink channel using the first SPS resources to receiving the downlink channel using the second SPS resources if the metric is met. In one aspect, the metric may include the timer, which may be started in response to using one of the first configuration or the second configuration, and the UE may switch to the other one of the first configuration or the second configuration based on expiration of the timer. In another aspect, the metric may be an inactivity timer, which may be started in response to no data being communicated (transmitted or received) based on one of the first configuration or the second configuration, and the UE may switch to the other one of the first configuration or the second configuration based on expiration of the inactivity timer. In another aspect, the metric may include the BSR threshold value, and the UE may switch between the first configuration and the second configuration in response to a BSR under current configuration being lower than the BSR threshold value. In another aspect, the metric may include the PHR threshold value, and the UE may switch between the first configuration and the second configuration in response to a PHR under current configuration being lower than the PHR threshold value. In another aspect, the metric may include the beam change, and the UE may switch between the first configuration and the second configuration in response to an occurrence of the beam change. In another aspect, the metric may include the change of an SB or a BWP, and the UE may switch between the first configuration and the second configuration in response to an occurrence of the SB or the BWP change. For example, at 416 and 418, the UE 402 may switch from the first configuration to the second configuration based on the metric received from the base station 404, or switch from the second configuration to the first configuration based on the metric received from the base station 404. Furthermore, 512 and 514 may be performed by the periodic resource configuration managing component 940.

Figure 6:
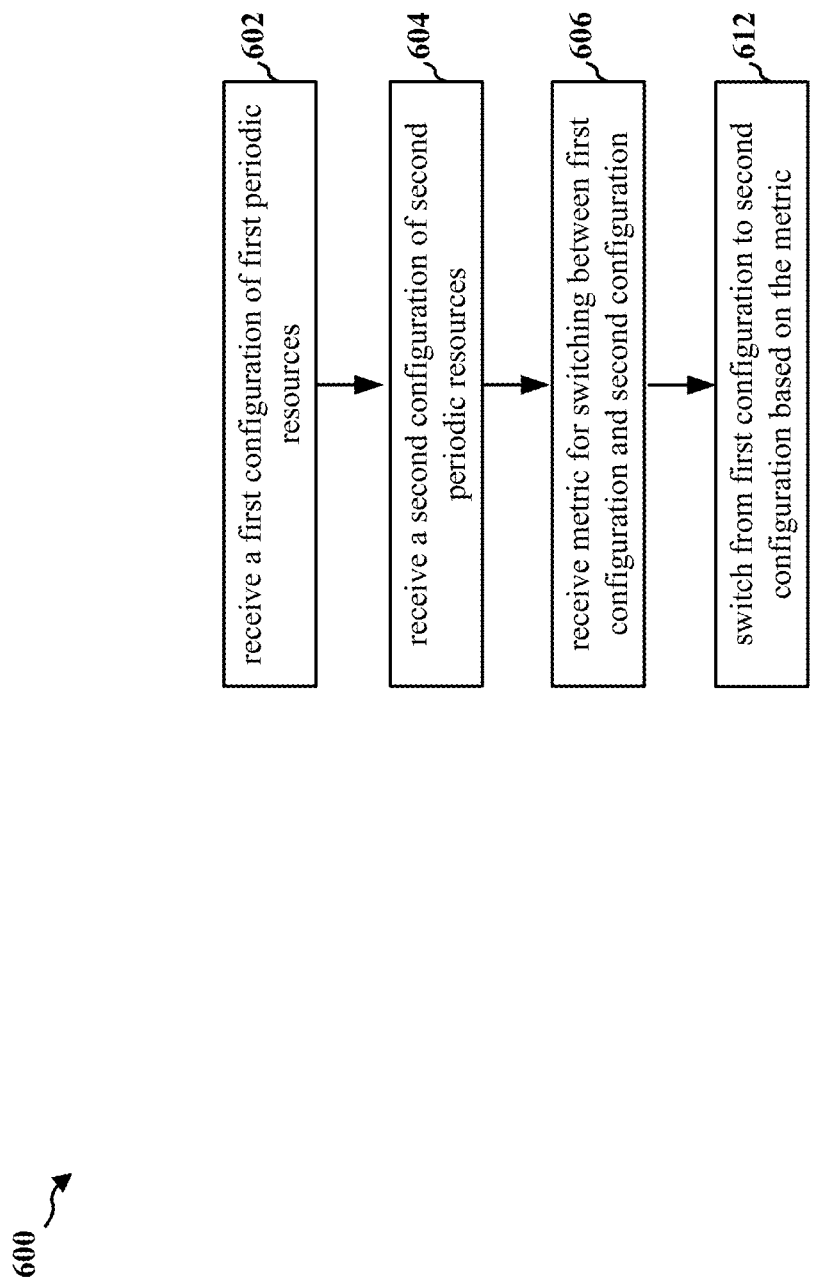
FIG. 6 is a flowchart of a method of wireless communication.

FIG. 6 is a flowchart 600 of a method of wireless communication. The method may be performed by a UE (e.g., the UE 104/402; the apparatus 902). The UE may receive, from the base station, a first configuration of first periodic resources and a second configuration of second periodic resources, and switch between the first configuration and the second configuration based on a metric received from the base station.

At 602, the UE may receive, from the base station, a first configuration of first periodic resources from the base station (e.g., at 406). The UE may receive, from the base station, the first configuration of the first periodic resources. The first configuration may be a first CG or a first SPS of first periodic uplink resources. In one aspect, the first configuration may be the first CG of the first periodic resources for uplink transmissions. In another aspect, the first configuration may be the first SPS of the first periodic resources for uplink transmissions. For example, at 406, the UE 402 may receive, from the base station 404, the first configuration of the first periodic resources. Furthermore, 602 may be performed by a periodic resource configuration managing component 940.

At 604, the UE may receive, from the base station, a second configuration of second periodic resources from the base station (e.g., at 408). The second configuration may be a second CG or a second SPS of second periodic uplink resources. In one aspect, the second configuration may be the second CG of the second periodic resources for uplink transmissions. In another aspect, the second configuration may be the second SPS of the second periodic resources for uplink transmissions. For example, at 408, the UE 402 may receive, from the base station 404, the second configuration of the second periodic resources. Furthermore, 604 may be performed by a periodic resource configuration managing component 940.

At 606, the UE may receive a metric for switching between the first configuration and the second configuration from the base station (e.g., at 410). The UE and the base station may switch between the first configuration and the second configuration based on the metric for switching between the first configuration and the second configuration. For example, at 410, the UE 402 may receive, from the base station 404, the metric for switching between the first configuration and the second configuration. Furthermore, 606 may be performed by a metric managing component 942.

At 612, the UE may switch from the first configuration to the second configuration based on the metric received from the base station (e.g., at 416). At 614, the UE may switch from the second configuration to the first configuration based on the metric received from the base station (e.g., at 418). When the first and second configurations are the first and second CGs of first and second uplink resources, the UE may switch from transmitting an uplink channel using the first CG to transmitting the uplink channel using the second CG if the metric is met. When the first and second configurations indicate the first and second SPS resources, the UE may switch from receiving a downlink channel using the first SPS resources to receiving the downlink channel using the second SPS resources if the metric is met. In one aspect, the metric may include the timer, which may be started in response to using one of the first configuration or the second configuration, and the UE may switch to the other one of the first configuration or the second configuration based on expiration of the timer. In another aspect, the metric may be an inactivity timer, which may be started in response to no data being communicated (transmitted or received) based on one of the first configuration or the second configuration, and the UE may switch to the other one of the first configuration or the second configuration based on expiration of the inactivity timer. In another aspect, the metric may include the BSR threshold value, and the UE may switch between the first configuration and the second configuration in response to a BSR under current configuration being lower than the BSR threshold value. In another aspect, the metric may include the PHR threshold value, and the UE may switch between the first configuration and the second configuration in response to a PHR under current configuration being lower than the PHR threshold value. In another aspect, the metric may include the beam change, and the UE may switch between the first configuration and the second configuration in response to an occurrence of the beam change. In another aspect, the metric may include the change of an SB or a BWP, and the UE may switch between the first configuration and the second configuration in response to an occurrence of the SB or the BWP change. For example, at 416 and 418, the UE 402 may switch from the first configuration to the second configuration based on the metric received from the base station 404, or switch from the second configuration to the first configuration based on the metric received from the base station 404. Furthermore, 612 and 614 may be performed by the periodic resource configuration managing component 940.

Figure 7:
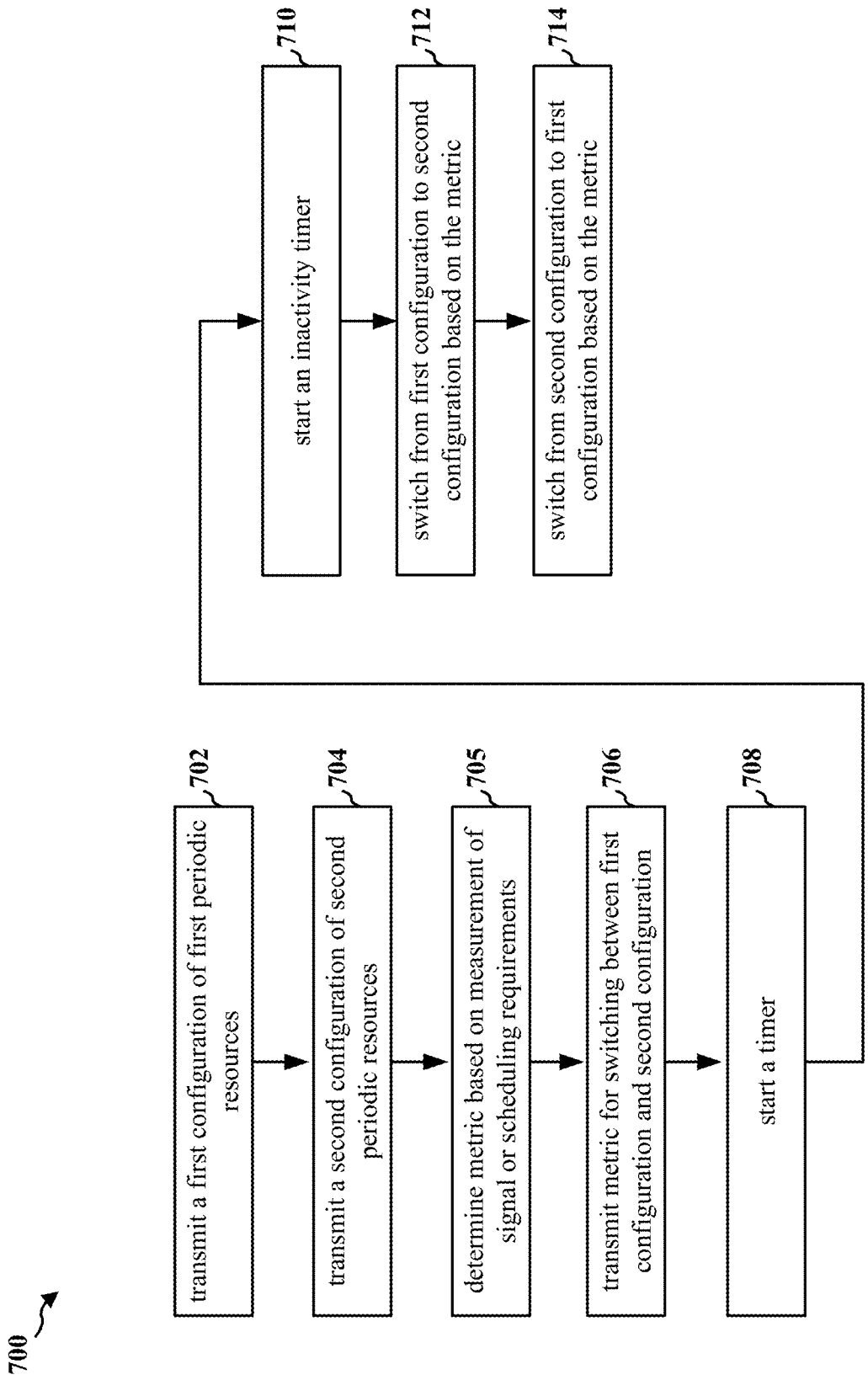
FIG. 7 is a flowchart of a method of wireless communication.

FIG. 7 is a flowchart 700 of a method of wireless communication. The method may be performed by a base station (e.g., the base station 102/180/404; the apparatus 1002.) The base station may configure a first configuration of first periodic resources and a second configuration of second periodic resources for a UE, and switch between the first configuration and the second configuration to communicate with the UE based on a metric.

At 702, the base station may transmit a first configuration of first periodic resources to the UE (e.g., at 406). The first configuration may be a first CG or a first SPS of first periodic uplink resources. In one aspect, the first configuration may be the first CG of the first periodic resources for uplink transmissions. In another aspect, the first configuration may be the first SPS of the first periodic resources for uplink transmissions. For example, at 406, the base station 404 may transmit a first configuration of first periodic resources to the UE 402. Furthermore, 802 may be performed by a periodic resource configuration managing component 1040.

At 704, the base station may transmit a second configuration of second periodic resources to the UE (e.g., at 408). The second configuration may be a second CG or a second SPS of second periodic uplink resources. In one aspect, the second configuration may be the second CG of the second periodic resources for uplink transmissions. In another aspect, the second configuration may be the second SPS of the second periodic resources for uplink transmissions. The second configuration may be different from the first configuration. For example, at 408, the base station 404 may transmit a second configuration of second periodic resources to the UE 402. Furthermore, 7 704 may be performed by a periodic resource configuration managing component 1040.

At 705, the base station may determine the metric based on at least one measurement of signal at the base station or scheduling specifications (e.g., at 409). The UE may provide a recommendation for the metric to the base station, and the base station may take the recommended metrics received from the UE into consideration to determine the metric to be indicated to the UE. In some aspects, the base station may switch between the first configuration and the second configuration based on the metric being met. In one aspect, the metric may be a timer, which may be started in response to using one of the first configuration or the second configuration, and the base station may switch to the other one of the first configuration or the second configuration based on expiration of the timer. In another aspect, the metric may be an inactivity timer, which may be started in response to no data being communicated (transmitted or received) based on one of the first configuration or the second configuration, and the base station may switch to the other one of the first configuration or the second configuration based on expiration of the inactivity timer. In another aspect, the metric may be a BSR threshold value, and the base station may switch between the first configuration and the second configuration in response to a BSR under current configuration being lower than the BSR threshold value. In another aspect, the metric may be a PHR threshold value, and the base station may switch between the first configuration and the second configuration in response to a PHR under current configuration being lower than the PHR threshold value. In another aspect, the metric may be a beam change, and the base station may switch between the first configuration and the second configuration in response to an occurrence of the beam change. In another aspect, the metric may be a change of an SB or a BWP, and the base station may switch between the first configuration and the second configuration in response to an occurrence of the SB or the BWP change. For example, at 409, the base station 404 may determine a metric based on at least one measurement of signal at the base station 404 or scheduling specifications. Furthermore, 703 may be performed by a metric managing component 1042.

At 706, the base station may transmit a metric for switching between the first configuration and the second configuration to the UE (e.g., at 410). That is, the UE may receive, from the base station, the metric for switching between the first configuration and the second configuration. The UE and the base station may switch between the first configuration and the second configuration based on the metric for switching between the first configuration and the second configuration. For example, at 410, the base station may transmit the metric for switching between the first configuration and the second configuration to the UE. Furthermore, 706 may be performed by the metric managing component 1042.

At 708, the base station may start a timer based on the metrics transmitted at 706 (e.g., at 422). 7 7 7 That is, the metric may be a timer, and the timer may be started in response to using one of the first configuration or the second configuration. The base station may switch to the other one of the first configuration or the second configuration based on expiration of the timer. In one aspect, the base station may start the timer in response to using the first configuration, and switch to the second configuration in response to the expiration of the timer. In another aspect, the base station may start the timer in response to using the second configuration, and switch to the first configuration in response to the expiration of the timer. For example, at 422, the base station 404 may start a timer. Furthermore, 708 may be performed by a timer component 1044.

At 710, the base station may start an inactivity timer based on the metrics transmitted at 706 (e.g., at 424). 7 7 7 That is, the metric may be an inactivity timer, which may be started in response to no data being communicated (transmitted or received) based on one of the first configuration or the second configuration, and the base station may switch to the other one of the first configuration or the second configuration based on expiration of the inactivity timer. In one aspect, the base station may start the inactivity timer in response to no data being transmitted or received based on the first configuration, and switch to the second configuration in response to the expiration of the inactivity timer. For example, at 424, the base station 404 may start an inactivity timer. Furthermore, 710 may be performed by the timer component 1044.

At 712, the base station may switch from the first configuration to the second configuration based on the metric transmitted to the UE (e.g., at 426). At 714, the base station may switch from the second configuration to the first configuration based on the metric transmitted to the UE (e.g., at 428). When the first and second configurations are the first and second CGs of first and second uplink resources, the base station may switch from transmitting an uplink channel using the first CG to transmitting the uplink channel using the second CG if the metric is met. When the first and second configurations indicate the first and second SPS resources, the base station may switch from receiving a downlink channel using the first SPS resources to receiving the downlink channel using the second SPS resources if the metric is met. In one aspect, the metric may include the timer, which may be started in response to using one of the first configuration or the second configuration, and the base station 404 may switch to the other one of the first configuration or the second configuration based on expiration of the timer. In another aspect, the metric may be an inactivity timer, which may be started in response to no data being communicated (transmitted or received) based on one of the first configuration or the second configuration, and the base station 404 may switch to the other one of the first configuration or the second configuration based on expiration of the inactivity timer. In another aspect, the metric may include the BSR threshold value, and the base station 404 may switch between the first configuration and the second configuration in response to a BSR under current configuration being lower than the BSR threshold value. In another aspect, the metric may include the PHR threshold value, and the base station 404 may switch between the first configuration and the second configuration in response to a PHR under current configuration being lower than the PHR threshold value. In another aspect, the metric may include the beam change, and the base station 404 may switch between the first configuration and the second configuration in response to an occurrence of the beam change. In another aspect, the metric may include the change of an SB or a BWP, and the base station 404 may switch between the first configuration and the second configuration in response to an occurrence of the SB or the BWP change. For example, at 426 and 428, the base station 404 may switch from the first configuration to the second configuration based on the metric transmitted to the UE 402, and also switch from the second configuration to the first configuration based on the metric transmitted to the UE 402. Furthermore, 712 and 714 may be performed by the periodic resource configuration managing component 1040.

Figure 8:
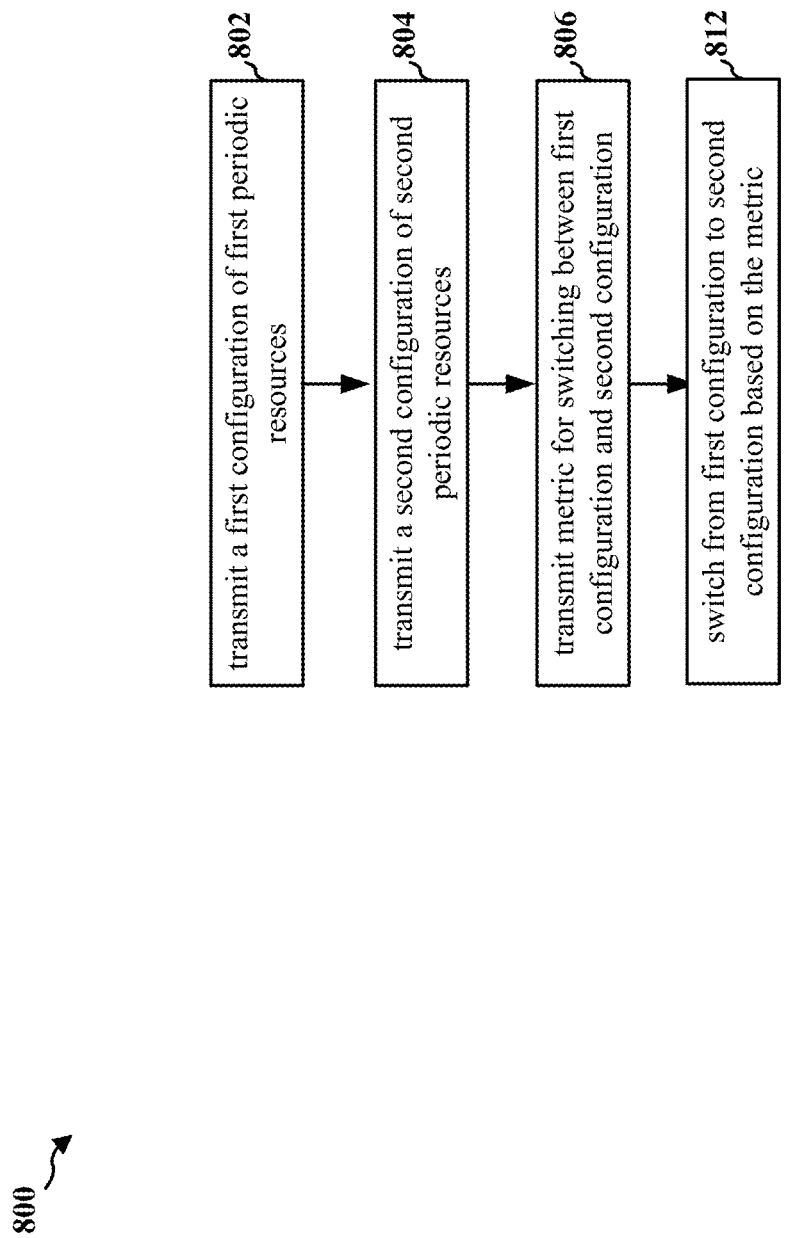
FIG. 8 is a flowchart of a method of wireless communication.

FIG. 8 is a flowchart 800 of a method of wireless communication. The method may be performed by a base station (e.g., the base station 102/180/404; the apparatus 1002.) The base station may configure a first configuration of first periodic resources and a second configuration of second periodic resources for a UE, and switch between the first configuration and the second configuration to communicate with the UE based on a metric.

At 802, the base station may transmit a first configuration of first periodic resources to the UE (e.g., at 406). The first configuration may be a first CG or a first SPS of first periodic uplink resources. In one aspect, the first configuration may be the first CG of the first periodic resources for uplink transmissions. In another aspect, the first configuration may be the first SPS of the first periodic resources for uplink transmissions. For example, at 406, the base station 404 may transmit a first configuration of first periodic resources to the UE 402. Furthermore, 802 may be performed by a periodic resource configuration managing component 1040.

At 804, the base station may transmit a second configuration of second periodic resources to the UE (e.g., at 408). The second configuration may be a second CG or a second SPS of second periodic uplink resources. In one aspect, the second configuration may be the second CG of the second periodic resources for uplink transmissions. In another aspect, the second configuration may be the second SPS of the second periodic resources for uplink transmissions. The second configuration may be different from the first configuration. For example, at 408, the base station 404 may transmit a second configuration of second periodic resources to the UE 402. Furthermore, 8 804 may be performed by a periodic resource configuration managing component 1040.

At 806, the base station may transmit a metric for switching between the first configuration and the second configuration to the UE (e.g., at 410). That is, the UE may receive, from the base station, the metric for switching between the first configuration and the second configuration. The UE and the base station may switch between the first configuration and the second configuration based on the metric for switching between the first configuration and the second configuration. For example, at 410, the base station may transmit the metric for switching between the first configuration and the second configuration to the UE. Furthermore, 806 may be performed by the metric managing component 1042.

At 812, the base station may switch from the first configuration to the second configuration based on the metric transmitted to the UE (e.g., at 426). At 814, the base station may switch from the second configuration to the first configuration based on the metric transmitted to the UE (e.g., at 428). When the first and second configurations are the first and second CGs of first and second uplink resources, the base station may switch from transmitting an uplink channel using the first CG to transmitting the uplink channel using the second CG if the metric is met. When the first and second configurations indicate the first and second SPS resources, the base station may switch from receiving a downlink channel using the first SPS resources to receiving the downlink channel using the second SPS resources if the metric is met. In one aspect, the metric may include the timer, which may be started in response to using one of the first configuration or the second configuration, and the base station 404 may switch to the other one of the first configuration or the second configuration based on expiration of the timer. In another aspect, the metric may be an inactivity timer, which may be started in response to no data being communicated (transmitted or received) based on one of the first configuration or the second configuration, and the base station 404 may switch to the other one of the first configuration or the second configuration based on expiration of the inactivity timer. In another aspect, the metric may include the BSR threshold value, and the base station 404 may switch between the first configuration and the second configuration in response to a BSR under current configuration being lower than the BSR threshold value. In another aspect, the metric may include the PHR threshold value, and the base station 404 may switch between the first configuration and the second configuration in response to a PHR under current configuration being lower than the PHR threshold value. In another aspect, the metric may include the beam change, and the base station 404 may switch between the first configuration and the second configuration in response to an occurrence of the beam change. In another aspect, the metric may include the change of an SB or a BWP, and the base station 404 may switch between the first configuration and the second configuration in response to an occurrence of the SB or the BWP change. For example, at 426 and 428, the base station 404 may switch from the first configuration to the second configuration based on the metric transmitted to the UE 402, and also switch from the second configuration to the first configuration based on the metric transmitted to the UE 402. Furthermore, 812 and 814 may be performed by the periodic resource configuration managing component 1040.

Figure 9:
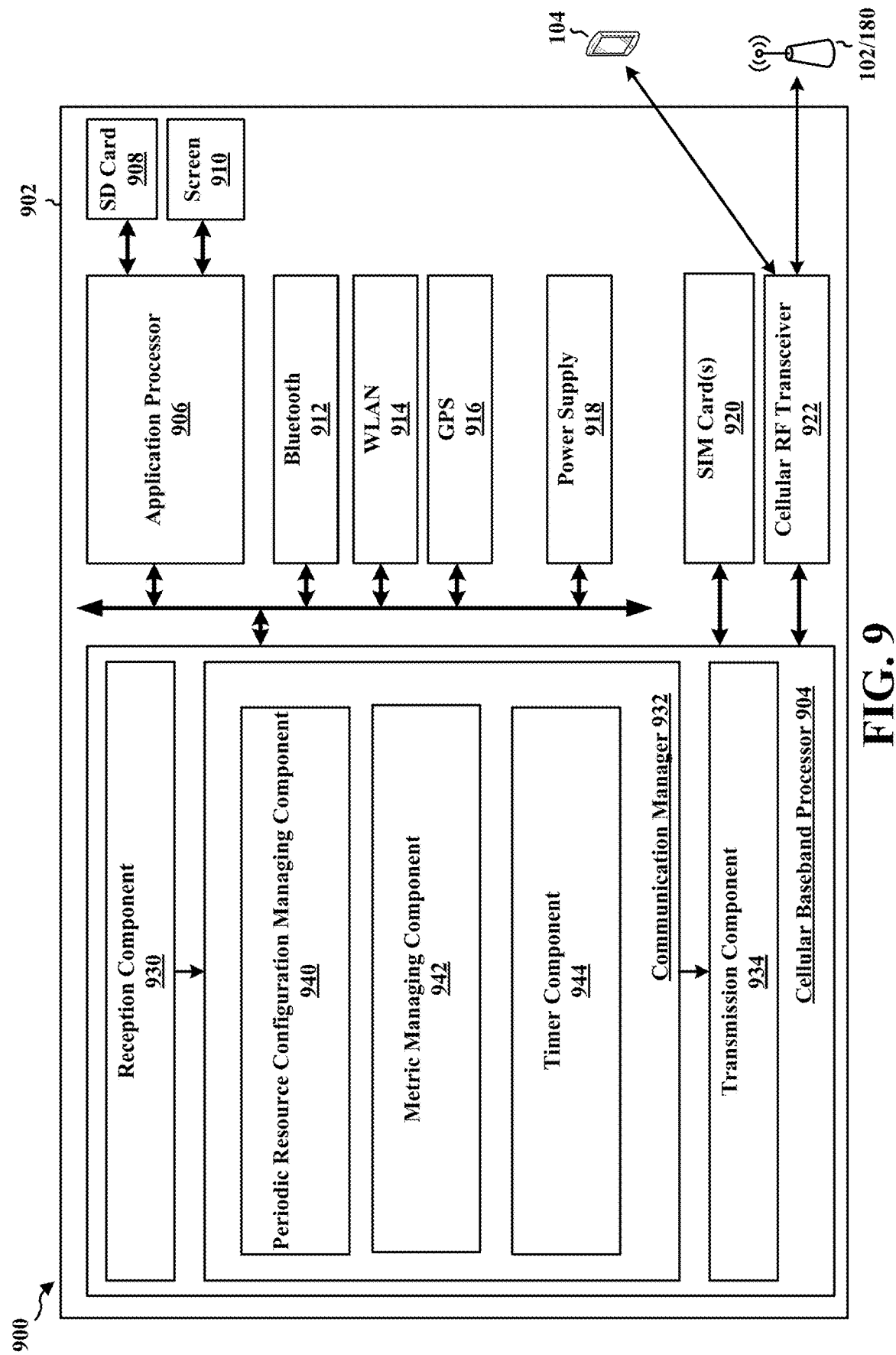
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a periodic resource configuration managing component 940 that is configured to receive first and second configurations of first and second periodic resources from the base station, switch from the first configuration to the second configuration based on the metric received from the base station, and switch from the second configuration to the first configuration based on the metric received from the base station, e.g., as described in connection with 502, 504, 512, 514, 602, 604, and 612. The communication manager 932 includes a metric managing component 942 that is configured to receive a metric for switching between the first configuration and the second configuration from the base station, e.g., as described in connection with 506 and 606. The communication manager 932 includes a timer component 944 that is configured to start a timer or an inactivity timer based on the metrics, e.g., as described in connection with 508 and 510.

The apparatus may include additional components that perform each of the blocks of the algorithm in the flowcharts of FIGS. 4, 5, and 6. As such, each block in the flowcharts of FIGS. 4, 5, and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for receiving a first configuration of first periodic resources, means for receiving a second configuration of second periodic resources, means for receiving, from a base station, a metric for switching between the first configuration and the second configuration, means for switching from the first configuration to the second configuration based on the metric received from the base station, and means for switching from the second configuration to the first configuration in response to the metric received from the base station. The apparatus 902 includes means for starting the timer in response to using the first configuration, and means for starting the inactivity timer in response to no data being transmitted or received based on the first configuration. The apparatus 902 also includes means for transmitting a recommended metric to the base station. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
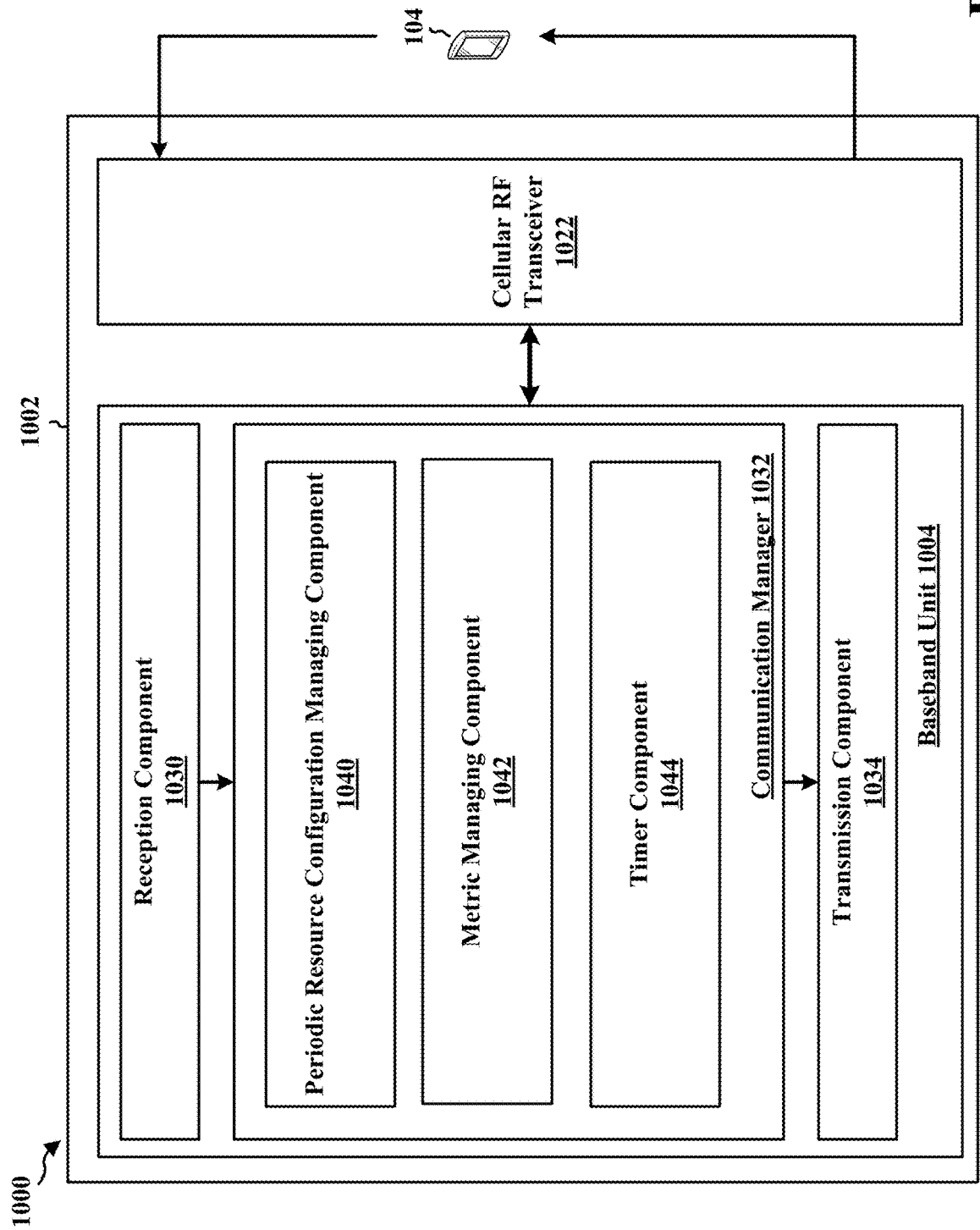
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 902 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a periodic resource configuration managing component 1040 that is configured to transmit first and second configurations of first and second periodic resources to the UE, switch from the first configuration to the second configuration based on the metric transmitted to the UE, and switch from the second configuration to the first configuration based on the metric transmitted to the UE, e.g., as described in connection with 702, 704, 712, 714, 802, 804, and 812. The communication manager 1032 further includes a metric managing component 1042 that is configured to determine the metric based on at least one measurement of signal at the base station or scheduling requirements, and transmit a metric for switching between the first configuration and the second configuration to the UE, e.g., as described in connection with 705, 706, and 806. The communication manager 1032 includes a timer component 1044 that is configured to start a timer or an inactivity timer based on the metrics, e.g., as described in connection with 708 and 710.

The apparatus may include additional components that perform each of the blocks of the algorithm in the flowcharts of FIGS. 4, 7, and 8. As such, each block in the flowcharts of FIGS. 4, 7, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting a first configuration of first periodic resources, means for transmitting a second configuration of second periodic resources, means for transmitting, to a user equipment (UE), a metric for switching between the first configuration and the second configuration, means for switching from the first configuration to the second configuration based on the metric transmitted to the UE, and means for switching from the second configuration to the first configuration based on the metric transmitted to the UE. The apparatus 802 includes means for starting the timer in response to using the first configuration, and means for starting the inactivity timer in response to no data being transmitted or received based on the first configuration. The aforementioned means may be one or more of the aforementioned components of the apparatus 802 configured to perform the functions recited by the aforementioned means. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

A UE may receive, from a base station, a first and second configurations of first and second periodic resources, receive, from the base station, a metric for switching between the first and second configurations, and switching from the first configuration to the second configuration based on the metric received from the base station. The first and second configurations may be CG of uplink resources for uplink channels. The first and second configurations may indicate SPS resources for downlink channels. The base station may determine the metric based on at least one measurement of signal at the base station or scheduling requirements. The metric may include at least one of a timer, an inactivity timer, a buffer status report (BSR) threshold value, a power headroom report (PHR) threshold value, a beam change, and/or a subband (SB) or a bandwidth part (BWP). The metric may be configured for each beam, or for application to all beams. Accordingly, the UE and the base station may switch between different configurations for periodic resources corresponding to the data transmission pattern while reducing the overall allocated resources without increasing signaling overhead from additional signals.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive a first configuration of first periodic resources, receive a second configuration of second periodic resources, receive, from a base station, a metric for switching between the first configuration and the second configuration, and switch from the first configuration to the second configuration based on the metric received from the base station.

Aspect 2 is the apparatus of aspect 1, further including a transceiver coupled to the at least one processor, where the first configuration is a first CG of first uplink resources and the second configuration is a second CG of second uplink resources, and the at least one processor and the memory are configured to switch from transmitting an uplink channel using the first CG to transmitting the uplink channel using the second CG based on the metric being met.

Aspect 3 is the apparatus of any of aspects 1 and 2, where the first configuration indicates first SPS resources and the second configuration indicates second SPS resources, and the at least one processor and the memory are configured to switch from receiving a downlink channel using the first SPS resources to receiving the downlink channel using the second SPS resources based on the metric being met.

Aspect 4 is the apparatus of any of aspects 1 to 3, where the metric includes a timer, and the at least one processor and the memory are further configured to start the timer in response to using the first configuration, and switch to the second configuration in response to expiration of the timer.

Aspect 5 is the apparatus of any of aspects 1 to 4, where the metric includes an inactivity timer, the inactivity timer is started in response to no data being transmitted or received based on the first configuration, and the at least one processor and the memory are configured to switch to the second configuration in response to expiration of the inactivity timer.

Aspect 6 is the apparatus of any of aspects 1 to 5, where the metric includes a BSR threshold value, and the at least one processor and the memory are configured to switch to the second configuration in response to a BSR being lower than the BSR threshold value.

Aspect 7 is the apparatus of aspect 6, where the at least one processor and the memory are further configured to switch from the second configuration to the first configuration in response to the BSR being equal to or greater than the BSR threshold value.

Aspect 8 is the apparatus of any of aspects 1 to 7, where the metric includes a PHR threshold value, and the at least one processor and the memory are configured to switch to the second configuration in response to a PHR being lower than the PHR threshold value.

Aspect 9 is the apparatus of aspect 8, where the at least one processor and the memory are further configured to switch from the second configuration to the first configuration in response to the PHR being equal to or greater than the PHR threshold value.

Aspect 10 is the apparatus of any of aspects 1 to 9, where the metric includes a beam change, and the at least one processor and the memory are configured to switch to the second configuration in response to an occurrence of the beam change.

Aspect 11 is the apparatus of aspect 10, where the beam change is based on change of at least one of a TCI state or a spatial relation.

Aspect 12 is the apparatus of any of aspects 1 to 11, where the metric includes a change of at least one of an SB or a BWP, and the at least one processor and the memory are configured to switch to the second configuration based on an occurrence of a BWP change or an SB change.

Aspect 13 is the apparatus of any of aspects 1 to 12, where the metric is configured for each beam.

Aspect 14 is the apparatus of any of aspects 1 to 13, where the metric is configured for application to all beams.

Aspect 15 is the apparatus of any of aspects 1 to 14, where the at least one processor and the memory are configured to transmit a recommended metric to the base station.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

Aspect 19 is an apparatus for wireless communication including at least one processor coupled to a memory and configured to transmit a first configuration of first periodic resources, transmit a second configuration of second periodic resources, transmit, to a UE, a metric for switching between the first configuration and the second configuration, and switch from the first configuration to the second configuration based on the metric transmitted to the UE.

Aspect 20 is the apparatus of aspect 19, further including a transceiver coupled to the at least one processor, where the first configuration is a first CG of first uplink resources and the second configuration is a second CG of second uplink resources, and the at least one processor and the memory are configured to switch from receiving an uplink channel using the first CG to receiving the uplink channel using the second CG based on the metric is met.

Aspect 21 is the apparatus of any of aspects 19 and 20, where the first configuration indicates first SPS resources and the second configuration indicates second SPS resources, and the at least one processor and the memory are configured to switch from transmitting a downlink channel using the first SPS resources to transmitting the downlink channel using the second SPS resources based on the metric being met.

Aspect 22 is the apparatus of any of aspects 19 to 21, where the metric includes a timer, and the at least one processor and the memory are further configured to start the timer in response to using the first configuration, and switch to the second configuration in response to expiration of the timer.

Aspect 23 is the apparatus of any of aspects 19 to 22, where the metric includes an inactivity timer, and the at least one processor and the memory are further configured to start the inactivity timer in response to no data being transmitted or received based on the first configuration, and switch to the second configuration in response to expiration of the inactivity timer.

Aspect 24 is the apparatus of any of aspects 19 to 23, where the metric includes a BSR threshold value, and the at least one processor and the memory are configured to switch to the second configuration in response to a BSR being lower than the BSR threshold value.

Aspect 25 is the apparatus of aspect 24, where the at least one processor and the memory are further configured to switch from the second configuration to the first configuration in response to the BSR being equal to or greater than the BSR threshold value.

Aspect 26 is the apparatus of any of aspects 19 to 25, where the metric includes a PHR threshold value, and the at least one processor and the memory are configured to switch to the second configuration in response to a PHR being lower than the PHR threshold value.

Aspect 27 is the apparatus of aspect 26, where the at least one processor and the memory are further configured to switch from the second configuration to the first configuration in response to the PHR being equal to or greater than the PHR threshold value.

Aspect 28 is the apparatus of any of aspects 19 to 26, where the metric includes a beam change, and the at least one processor and the memory are configured to switch to the second configuration in response to an occurrence of the beam change.

Aspect 29 is the apparatus of aspect 28, where the beam change is based on change of at least one of a TCI state or a spatial relation.

Aspect 30 is the apparatus of any of aspects 19 to 29, where the metric includes a change of at least one of an SB or a BWP, where the at least one processor and the memory are configured to switch to the second configuration based on an occurrence of a BWP change or an SB change.

Aspect 31 is the apparatus of any of aspects 19 to 30, where the at least one processor and the memory are further configured to determine the metric based on at least one measurement of signal at the base station or scheduling specifications.

Aspect 32 is the apparatus of aspect 31, where the at least one processor and the memory are further configured to receive a recommendation of the metric from the UE, and the metric is determined in consideration of the received recommendation of the metric.

Aspect 33 is the apparatus of any of aspects 19 to 32, where the metric is configured for each beam.

Aspect 34 is the apparatus of any of aspects 19 to 33, where the metric is configured for application to all beams.

Aspect 35 is a method of wireless communication for implementing any of aspects 19 to 34.

Aspect 36 is an apparatus for wireless communication including means for implementing any of aspects 19 to 34.

Aspect 37 is a computer-readable medium storing computer executable code, where the code when executed by a processor causes the processor to implement any of aspects 19 to 34.

What is claimed is:

1. An apparatus of wireless communication at a user equipment (UE), comprising:
   a memory; and
   at least one processor coupled to the memory, the at least one processor-configured to:
      receive a first configuration of first periodic resources;
      receive a second configuration of second periodic resources;
      receive, from a base station, a metric for switching between the first configuration and the second configuration; and
      switch from the first configuration to the second configuration in response to the metric being met;
      wherein the metric comprises a buffer status report (BSR) threshold value, and the at least one processor is configured to switch to the second configuration in response to a BSR being lower than the BSR threshold value.

2. The apparatus of claim 1, further comprising at least one antenna and a transceiver coupled to the at least one processor,
wherein the first configuration is a first configured grant (CG) of first uplink resources and the second configuration is a second CG of second uplink resources, and the at least one processor is configured to switch from transmitting an uplink channel using the first CG to transmitting the uplink channel using the second CG in response to the metric being met.

3. The apparatus of claim 1, wherein the first configuration indicates first semi-persistent scheduling (SPS) resources and the second configuration indicates second SPS resources, and the at least one processor is configured to switch from receiving a downlink channel using the first SPS resources to receiving the downlink channel using the second SPS resources in response to the metric being met.

4. The apparatus of claim 1, wherein the metric comprises a timer, and the at least one processor is further configured to:
start the timer in response to using the first configuration; and
switch to the second configuration in response to expiration of the timer.

5. The apparatus of claim 1, wherein the metric comprises an inactivity timer,
wherein the inactivity timer is started in response to no data being transmitted or received based on the first configuration, and the at least one processor is configured to switch to the second configuration in response to expiration of the inactivity timer.

6. The apparatus of claim 1, wherein the at least one processor is further configured to switch from the second configuration to the first configuration in response to the BSR being equal to or greater than the BSR threshold value.

7. The apparatus of claim 1, wherein the metric comprises a power headroom report (PHR) threshold value, and the at least one processor is configured to switch to the second configuration in response to a PHR being lower than the PHR threshold value.

8. The apparatus of claim 7, wherein the at least one processor is further configured to switch from the second configuration to the first configuration in response to the PHR being equal to or greater than the PHR threshold value.

9. The apparatus of claim 1, wherein the metric comprises a beam change, and the at least one processor is configured to switch to the second configuration in response to an occurrence of the beam change.

10. The apparatus of claim 9, wherein the beam change is based on change of at least one of a transmission configuration indicator (TCI) state or a spatial relation.

11. The apparatus of claim 1, wherein the metric comprises a change of at least one of a subband (SB) or a bandwidth part (BWP), and the at least one processor is configured to switch to the second configuration in response to an occurrence of a BWP change or an SB change.

12. The apparatus of claim 1, wherein the metric is configured for each beam or for application to all beams.

13. The apparatus of claim 1, wherein the at least one processor is configured to transmit a recommended metric to the base station.

14. A method for wireless communication at a user equipment (UE), comprising:
receiving a first configuration of first periodic resources;
receiving a second configuration of second periodic resources;
receiving, from a base station, a metric for switching between the first configuration and the second configuration; and
switching from the first configuration to the second configuration in response to the metric being met;
wherein the metric comprises a buffer status report (BSR) threshold value, and the switching to the second configuration is in response to a BSR being lower than the BSR threshold value.

15. An apparatus for wireless communication at a base station, comprising:
a memory; and
at least one processor coupled to the memory and configured to:
transmit a first configuration of first periodic resources;
transmit a second configuration of second periodic resources;
transmit, to a user equipment (UE), a metric for switching between the first configuration and the second configuration; and
switch from the first configuration to the second configuration in response to the metric being met;
wherein the metric comprises a buffer status report (BSR) threshold value, and the at least one processor is configured to switch to the second configuration in response to a BSR being lower than the BSR threshold value.

16. The apparatus of claim 15, further comprising at least one antenna and a transceiver coupled to the at least one processor,
wherein the first configuration is a first configured grant (CG) of first uplink resources and the second configuration is a second CG of second uplink resources, and the at least one processor is configured to switch from receiving an uplink channel using the first CG to receiving the uplink channel using the second CG in response to the metric is met.

17. The apparatus of claim 15, wherein the first configuration indicates first semi-persistent scheduling (SPS) resources and the second configuration indicates second SPS resources, and the at least one processor is configured to switch from transmitting a downlink channel using the first SPS resources to transmitting the downlink channel using the second SPS resources in response to the metric being met.

18. The apparatus of claim 15, wherein the metric comprises a timer,
wherein the at least one processor is further configured to:
start the timer in response to using the first configuration; and
switch to the second configuration in response to expiration of the timer.

19. The apparatus of claim 15, wherein the metric comprises an inactivity timer,
wherein the at least one processor is further configured to:
start the inactivity timer in response to no data being transmitted or received based on the first configuration; and
switch to the second configuration in response to expiration of the inactivity timer.

20. The apparatus of claim 15, wherein the at least one processor is further configured to switch from the second configuration to the first configuration in response to the BSR being equal to or greater than the BSR threshold value.

21. The apparatus of claim 15, wherein the metric comprises a power headroom report (PHR) threshold value, and the at least one processor is configured to switch to the second configuration in response to a PHR being lower than the PHR threshold value.

22. The apparatus of claim 21, wherein the at least one processor is further configured to switch from the second configuration to the first configuration in response to the PHR being equal to or greater than the PHR threshold value.

23. The apparatus of claim 15, wherein the metric comprises a beam change,
wherein the at least one processor is configured to switch to the second configuration in response to an occurrence of the beam change, and the beam change is based on change of at least one of a transmission configuration indicator (TCI) state or a spatial relation.

24. The apparatus of claim 15, wherein the metric comprises a change of at least one of a subband (SB) or a bandwidth part (BWP), wherein the at least one processor is configured to switch to the second configuration in response to an occurrence of a BWP change or an SB change.

25. The apparatus of claim 15, wherein the at least one processor is further configured to determine the metric based on at least one measurement of signal at the base station or scheduling specifications.

26. The apparatus of claim 25, wherein the at least one processor is further configured to receive a recommendation of the metric from the UE, wherein the metric is determined in consideration of the recommendation of the metric.

27. The apparatus of claim 15, wherein the metric is configured for each beam or for application to all beams.

28. A method for wireless communication at a base station, comprising:
transmitting a first configuration of first periodic resources;
transmitting a second configuration of second periodic resources;
transmitting, to a user equipment (UE), a metric for switching between the first configuration and the second configuration; and
switching from the first configuration to the second configuration in response to the metric being met;
wherein the metric comprises a buffer status report (BSR) threshold value, and the switching to the second configuration is in response to a BSR being lower than the BSR threshold value.

* * * * *